(12) United States Patent
Thornton et al.

(10) Patent No.: US 6,582,559 B2
(45) Date of Patent: Jun. 24, 2003

(54) ALDEHYDE-CONTAINING POLYMERS AS WET STRENGTH ADDITIVES

(75) Inventors: Jeffrey Wilson Thornton, Huizen (NL); Dorine Lisa Van Brussel-Verraest, Boskoop (NL); Arie Besemer, Amerongen (NL); Sussan Sandberg, Onsala (SE)

(73) Assignee: SCA Hygiene Products Zeist B.V., Zeist (NL)

(*) Notice: Subject to any disclaimer, the term of this patent is extended or adjusted under 35 U.S.C. 154(b) by 0 days.

(21) Appl. No.: 09/848,212

(22) Filed: May 4, 2001

(65) Prior Publication Data

US 2002/0026993 A1 Mar. 7, 2002

Related U.S. Application Data

(60) Provisional application No. 60/203,913, filed on May 12, 2000.

(30) Foreign Application Priority Data

May 4, 2000 (EP) .............................................. 00201630
May 11, 2000 (EP) ............................................. 00201693

(51) Int. Cl.$^7$ ..................... D21H 21/20; D21H 17/24; D21H 17/25; D21H 17/28; C08B 15/00; C08B 31/00
(52) U.S. Cl. ..................... 162/175; 162/177; 162/174; 162/158
(58) Field of Search ..................... 162/9, 157.6, 158, 162/175, 178, 146, 165.17, 164.15, 164.6, 168.1, 179, 174, 176, 177; 8/120, 181, 108.1, 107, 116.1, 189

(56) References Cited

U.S. PATENT DOCUMENTS

| | | | |
|---|---|---|---|
| 3,087,852 A | | 4/1963 | Hofreiter et al. |
| 3,364,200 A | | 1/1968 | Ashton et al. |
| 3,553,193 A | | 1/1971 | Le Roy et al. |
| 4,001,032 A | | 1/1977 | Heath et al. |
| 4,124,439 A | * | 11/1978 | Dessauer .................... 162/146 |
| 4,731,162 A | | 3/1988 | Solarek et al. |
| 4,741,804 A | | 5/1988 | Solarek et al. |
| 5,049,634 A | * | 9/1991 | Tsai et al. .................... 527/312 |
| 5,316,623 A | * | 5/1994 | Espy ........................ 162/164.3 |
| 5,698,688 A | * | 12/1997 | Smith et al. .................... 536/56 |
| 5,935,383 A | | 8/1999 | Sun et al. |
| 6,228,126 B1 | * | 5/2001 | Cimecioglu et al. ............ 8/107 |
| 6,265,570 B1 | * | 7/2001 | Cimecioglu et al. ......... 536/102 |
| 6,319,361 B1 | * | 11/2001 | Smith et al. ................. 162/146 |
| 6,368,456 B1 | * | 4/2002 | Cimecioglu et al. ........ 162/146 |
| 6,409,881 B1 | * | 6/2002 | Jaschinski .................... 162/100 |

FOREIGN PATENT DOCUMENTS

| | | | | |
|---|---|---|---|---|
| EP | 232851 A2 | * | 8/1987 | ........... C08B/11/04 |
| EP | 283951 A1 | * | 9/1988 | ........... C08B/11/04 |
| EP | 1149846 A1 | * | 10/2001 | ........... C08B/31/18 |
| NL | 9301172 | | 2/1995 | |
| WO | 95/07303 | | 3/1995 | |
| WO | 97/36054 | | 10/1997 | |
| WO | 99/23117 | | 5/1999 | |
| WO | 99/23240 | | 5/1999 | |
| WO | 00/11046 | | 3/2000 | |
| WO | 00/26257 | | 5/2000 | |
| WO | 00/50388 | | 8/2000 | |
| WO | 00/50621 | | 8/2000 | |

OTHER PUBLICATIONS

Espy, TAPPI Journal, 78, 90 (1995).
Hofreiter et al., TAPPI Journal, 57, 81 (1974).
Mehltretter et al. TAPPI Journal, 45, 750 (1962).
Whistler, J. Am. Chem. Soc., 79, 6460 (1957).
PhD Thesis of Floor, Delft University of Technology, 1989.
Deary and Davies in Carbohydr. Research 309, 17–29 (1998).
Torneport et al., Starch 42, 413–417 (1990).
Salmonsson et al., Carbohydrate Res. 217 (1991).
Painter, Carbohydrate Research 55, 950193 (1977).
Painter, Carbohydrate Research 140, 61–68 (1985).

* cited by examiner

*Primary Examiner*—Jose A Fortuna
(74) *Attorney, Agent, or Firm*—Burns, Doane, Swecker & Mathis, L.L.P.

(57) ABSTRACT

The invention concerns the use of a water-soluble or water-dispersible polymer having a molecular weight of at least 800, containing at least 5 aldehyde groups per molecule and at least 1 carboxyl group per molecule, the ratio of aldehyde groups to carboxyl groups being higher than 0.75:1, as a wet strength additive. The invention also discloses novel cationic derivatives thereof.

11 Claims, 6 Drawing Sheets

ALDEHYDE-CONTAINING POLYMERS AS WET STRENGTH ADDITIVES

Figure 1:
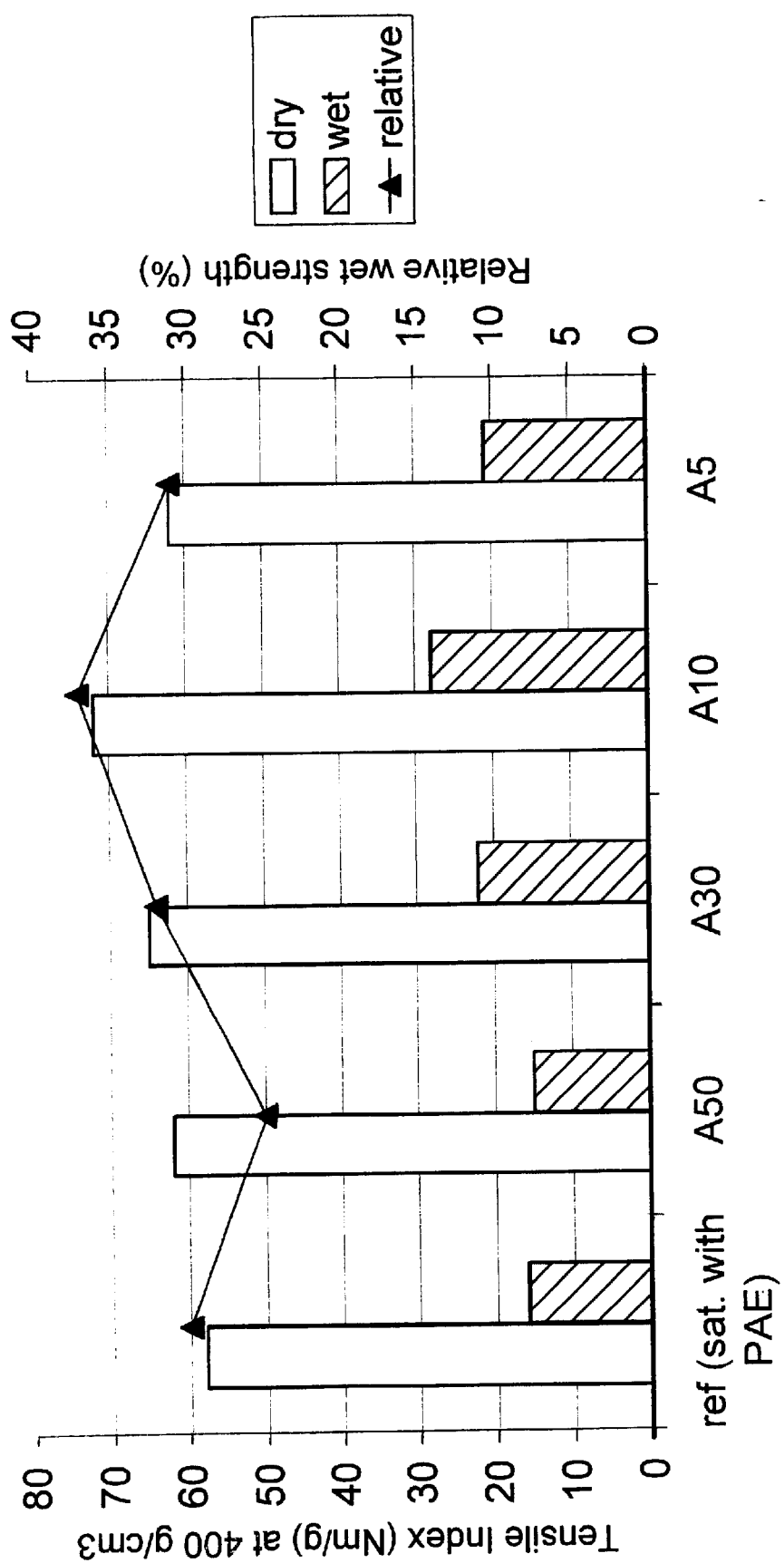

This application claims priority under 35 U.S.C. §§119 and/or 365 to 00201630.1 filed in Europe on May 4, 2000; and 00201693.9 filed in Europe on May 11, 2000; the entire content of which is hereby incorporated by reference.

The present invention relates to the use of multifunctional aldehyde-containing polymers as temporary wet strength agents for paper and tissue applications, as well as non-wovens.

Wet strength is an important characteristic of paper and tissue products, and in non-woven products. Wet strength of such products can be increased by using wet strength additives. The most widely used wet strength additives for the paper industry are melamine-formaldehyde and urea-formaldehyde. There is a tendency, however, to move away from such oil-based chemicals, because they are not renewable and have a poor biodegradability. Carboxymethyl cellulose (CMC) is currently used in combination with PAE (polyamino-amide epichlorohydrin) as a wet strength agent (see Espy, TAPPI Journal, 78, 90 (1995)). However, CMC is also partly dependent on oil-based materials (monochloroacetic acid) and, moreover, is a rather expensive material.

Oxidized celluloses have the advantage of being accessible from renewable raw materials only and possibly of being less expensive than CMC, while they may have comparable properties to CMC. However, the oxidation of cellulose is hampered by the poor solubility of cellulose, making it insufficiently accessible to oxidizing agents.

Aldehyde functions have been recognized as being useful in binding cellulose fibers, to improve wet strength of the fibers. Thus, dialdehyde starch (TAPPI, 57, 81 (1974); and TAPPI 45, 750 (1962)) and dialdehyde guar and the like (WO 97/36054) have been proposed as paper wet strength additives. U.S. Pat. No. 3,087,852 and U.S. Pat. No. 4,001,032 disclose cationic dialdehyde starch, obtained by reacting dialdehyde starch with betaine hydrazide, to be used as a paper strengthening additive.

U.S. Pat. No. 5,935,383 discloses the use of anionic compounds, such as sulfato-ethylamino-halotriazines, for providing the cellulose surface with additional anionic sites suitable for retaining a high proportion of cationic wet strength additives such as PAE resin on the cellulose.

WO 99/23117 and WO 99/23240 describe the oxidation of cellulose and starch, respectively, with TEMPO and an oxidative enzyme (laccase) and oxygen at pH 4–9 resulting in products containing low levels of carbaldehyde and carboxyl groups.

U.S. Pat. No. 3,553,193 describes the oxidation of starch with bromite or hypobromite, which results in varying levels of carbonyl (ketonic) and carboxyl groups depending on the oxidation conditions, with a carbonyl/carboxyl ratio of between 2:1 and 8:1. The oxidation products are stated to be suitable as paper strength additives. The oxidation of starch with sodium hypochlorite is believed first to yield keto groups. In a later stage of oxidation aldehyde groups may be formed. The mechanism postulated by Whistler (J. Am. Chem. Soc., 79, 6460 (1957), see also PhD thesis of Floor, Delft University of Technology, 1989) however states that a diketo group is formed, which decomposes with OH— and is oxidized. One has to assume that hypobromite reacts in an analogous way. A recent publication of Deary and Davies in Carbohydr. Research 309, 17–29 (1998) reviews the bromine oxidation and confirms that keto groups are the primary products from bromine oxidation. From their experiments with α-cyclodextrins they conclude also that the keto product is formed. They present no evidence for the formation of aldehydes. Also, Torneport et al (Starch 42, 413–417 (1990)) and Salomonsson et al (Carbohydrate Res. 217 (1991)) state that oxidation of starch with bromine species ($Br_2$:CH=1/40 to 1/1) at: pH 7 results in keto groups and carboxylic acids, It is known that higher pH's lead to higher carboxylate contents.

It was found that multifunctional polymers, especially biopolymers, having both aldehyde functions and carboxylic acid and/or other anionic functions, the ratio between aldehyde functions and anionic functions (hereafter referred to as A/C ratio) being at least 0.75:1, preferably at least 2:1, up to about 15:1, preferably up to 10:1, are very useful as wet strength additives. These polymers are excellent substitutes for known wet strength agents such as carboxymethyl cellulose (CMC) and dialdehyde starch because of their better ecological acceptability (degradability) and their improved water-solubility and thus better accessibility to further reagents, and an improved functionality.

The polymers to be used can be of a synthetic type, such as a copolymer of acrylic acid and acrolein, a copolymer of maleic acid and maleic (mono)aldehyde, appropriately modified polyvinyl alcohol or appropriately (aldehyde-) substituted polyacrylic acid or the like, having the desired level of aldehyde groups and the desired A/C ratio.

It is preferred, however, that the polymer is a biopolymer. Suitable biopolymers include (modified) peptides and proteins, proteoglycans and in particular polysaccharide-types of polymer. Examples of polysaccharides include α-1,4-glucans (the "starch family", including amylose, amylopectin, dextrins and cyclodextrins), α-1,6-glucans (dextran) and mixed α-glucans such as pullulan, β-1,4-glucans (cellulose), β-1,3-glucans such as scleroglucan and curdlan, xyloglucans, glucomannans and galactomannans (guar and locust bean gum), other gums including heterogeneous gums like xanthan, ghatti, carrageenans, alginates, pectin, (arabino)xylans (hemicellulose), β-2,1- and β-2,6-fructans (inulin and levan), etc. The biopolymers may also be synthetically modified.

The simultaneous presence of aldehyde and anionic, such as carboxyl (—$CO_2H$), sulfo (—$SO_3H$) and phosphono (—$PO_3H_2$) groups, can be achieved by various methods. These methods comprise:

(1) introduction of anionic groups by addition, followed by introduction of aldehyde functions, e.g. by oxidation; here, the anionic groups such as carboxyl groups or other acid groups may be introduced e.g. by carboxyalkylation, sulfatation, sulfoalkylation, phosphatation, or the like, or they may be present in polymers which already have added acid groups by biosynthesis such as sulfate groups in carrageenans; the aldehyde functions can be introduced e.g. by oxidation of 1,2-dihydroxyethylene groups (such as those at the 2,3-position of 1,4-linked or 1,6-linked glucans) using periodate-type oxidizing agents, or by partial oxidation of hydroxymethyl groups (such as those at the 6-position of 1,4-linked or 1,3-linked glucans) using nitric oxide (NOx) types of oxidizing agents;

(2) introduction of carboxyl groups by oxidation of hydroxymethyl groups followed by introduction of aldehyde functions by oxidation as under (1); here, the carboxyl (anionic) groups are introduced by oxidation of the hydroxymethyl groups, such as those at the 6-position of 1,4-linked or 1,3-linked glucans, using NOx-type of oxidizing agents, or they may be present in polymers already containing 6-carboxyl groups by biosynthesis, if necessary after hydrolysis of ester groups, such as pectins, xanthans and alginates; the aldehyde groups can again be introduced e.g. by oxidation of 1,2-dihydroxyethylene groups, or by partial oxidation of further hydroxymethyl groups;

(3) controlled oxidation of hydroxymethyl groups (such as those at the 6-position of 1,4-linked or 1,3-linked glucans) so as to partly convert them to aldehyde functions and to convert only a (minor) part of the aldehyde functions so obtained to carboxyl functions;

(4) introduction of aldehyde groups, e.g. by oxidation of 1,2-dihydroxyethylene groups (such as those at the 2,3-position of 1,4-linked or 1,6-linked glucans) using periodate-type oxidizing agents, followed by partial further oxidation thereof to carboxyl groups using different oxidizing agents such chlorite or bromine;

(5) introduction of (protected) aldehyde groups (e.g. furan acetals) by etherification, e.g. as described in U.S. Pat. No. 4,731,162 and U.S. Pat. No. 4,741,804, followed by introduction of carboxymethyl groups.

Further combinations of partial reaction steps as described above are also contemplated.

The individual reaction steps referred to above are known in the art. Carboxy-methylation of polysaccharides is also widely used in the art, and is commonly performed using sodium monochloroacetate in alkaline medium or by hydroxyalkylation (e.g. with ethylene oxide) followed by catalytic oxidation. Other carboxyalkylation, such as carboxy-ethylation, can be accomplished by base-catalyzed addition of acrylamide followed by hydrolysis, or by addition of succinic or maleic or other anhydride, etc. Sulfate and sulfo groups can be introduced by reaction with sulfuric acid derivatives such as chlorosulfonic acid or with vinylsulfonic acid or taurine analogues. Phosphorylation can be achieved by reaction with phosphoric acid or its derivatives or with haloalkyl-phosphonic acids, Also, oxidation of 1,2-dihydroxyethylene groups in the recurring units of polysaccharides is extensively known, and can be performed with periodate or similar polyoxyanions, resulting in C—C bond scission according to the equation:

—CHOH—CHOH—→—CH=O+O=CH— and thus to opening of the cyclic anhydromonosaccharide unit. These products are usually referred to as "dialdehyde carbohydrates" such as dialdehyde starch (DAS) and dialdehyde inulin (DAI).

The partial further oxidation of these dialdehyde carbohydrates can be accomplished, e.g. with sodium chlorite with or without hydrogen peroxide, the molar amount of chlorite, with respect to the dialdehyde product, determining the carboxyl content of the final product.

A particularly advantageous method of further oxidizing dialdehyde carbohydrates in a partial and controlled manner is described in PCT/NL99/00673 (WO00/26257, published May 11, 2000) and proceeds by reacting the dialdehyde product with a catalytic amount of halogen, such as chlorine, iodine and especially bromine. Halogen is regenerated in situ by oxidation with an oxidizing agent. Sodium hypochlorite can be used for the (re)generation of the molecular halogen, but preference is given to peracids. The catalytic amount of molecular halogen may be 0.2–40, preferably from 1 to 10 mole %, with respect to the amount of peracid. The peracid may be any peralkanoic acid such as peracetic acid, perpropionic acid, perlauric acid etc., a substituted peralkanoic acid such as peroxy-trifluoroacetic acid, an optionally substituted aromatic peracid such as perbenzoic acid or m-chloroperbenzoic acid, or an inorganic peracid such as perboric or persulfuric acid. The molar amount of oxidizing agent (e.g. peracid) with respect to the dialdehyde product, determines the carboxyl content of the final product.

This method, besides reducing the amount of halide produced, is also beneficial to the properties of the partially oxidized products, in particular as to a more regular distribution of carboxyl and aldehyde groups. In addition, this method is cheaper than the oxidation with sodium chlorite in the presence of hydrogen peroxide and produces less halide waste.

The selective oxidation of hydroxymethyl groups (i.e. primary hydroxyl functions) to aldehyde and/or carboxyl functions has been known for several years. Nitric. oxides, i.e, nitrogen dioxide and dinitrogen tetroxide or nitrite/nitrate are known in the art as suitable oxidizing agents for these oxidations, as described e.g. in U.S. Pat. No. 3,364,200 and NL patent application 93.01172 and by Painter, Carbohydrate Research 55, 950193 (1977) and ibid. 140, 61–68 (1985). This oxidation may be performed in an apolar, e.g. halogenated, solvent, or in an aqueous solvents, such as phosphoric acid.

A preferred reagent for the selective oxidation of hydroxymethyl groups is constituted by nitroxyl compounds, such as TEMPO (2,2,6,6-tetramethyl-piperidine-N-oxide) and related compounds such as 2,2,5, 5-tetramethylpyrrolidine-N-oxyl, 2,2,5,5-tetramethylimidazoline-N-oxyl, and 4-hydroxy TEMPO and derivatives thereof such as the 4-phosphonooxy, 4-acetoxy, 4-benzoyloxy, 4-oxo, 4-amino, 4-acetamino, 4-maleimido, 4-isothiocyanato, 4-cyano and 4-carboxy TEMPO. TEMPO is used in these reactions as a catalyst (e.g. using 0.1–25 mol % with respect to final oxidizing agent) in the presence of a final oxidizing agent such as hypochlorite or hydrogen peroxide. TEMPO oxidation has been described e.g. in WO 95/07303. Further intermediate oxidants such as metal complexes (see PCT/NL00/00118=WO 00/50388), enzymes such as laccase or peroxidases (see WO 99/23240 and WO 99/23117 and PCT/NL00/00117=WO 00/50621) can be used. Examples of metal complexes are complexes of a transition metal such as manganese, iron, cobalt, nickel, copper, vanadium or ruthenium, with a complexing agent, especially nitrogen-containing compound such as a bipyridyl, a trimethyl-triazonane or other poly(tertiary amine) or a (poly)histidine; such metal complexes can be used in an amount of 1–25 mol % with respect to the number a aldehyde or carboxyl groups desired. The actual oxidizing species in the TEMPO-mediated oxidations is believed to be the nitrosonium ion. The A/C ratio can be controlled by selecting appropriate conditions: aldehyde formation is favored at low temperatures (0–20° C.) and at relatively low pH (3–7) and by controlled addition and/or low levels of oxidizing agent.

The anionic groups in the products thus obtained may be free carboxyl, sulfo or phosphono groups (acid form) or may be in the salt form, e.g. with sodium, potassium, ammonium or substituted ammonium as the counter cation. The aldehyde- and acid-containing products have at least 5 aldehyde groups, especially at least 10 aldehyde groups, and at least 1 anionic group, especially at least 3 anionic groups, such as carboxyl groups, per molecule, also depending on the molecular weight (degree of polymerization, DP). Thus, for smaller molecules, e.g. having a molecular weight below 3,000, the number of aldehyde groups per molecule may be lower, e.g. at least one per 600 Da, with a minimum of 2. The degree of substitution (DS) for aldehyde groups is preferably between 5 and 98% of the maximum value, more preferably between 25 and 75%, As the maximum number of aldehyde groups in most oxidized polysaccharides is 3 per recurring (monosaccharide) unit, the DS expressed in number of substituent groups per recurring unit is at least 0.10, preferably between 0.15 and 2.95, more preferably between 0.25 and 2.25). The DS for anionic groups, especially carboxylic groups, is preferably between 0.03 and 1.0, more preferably between 0.05 and 0.4 per recurring unit.

If desired for the purpose of enhancing vet strength, the multifunctional product can be further chemically modified. A particularly suitable derivative is a product also containing cationic groups. Such cationic groups can be introduced by reacting a part of the aldehyde groups with an amine, hydrazine, hydrazide or the like, optionally under reductive conditions, or by reacting, at some stage during the production, saccharidic hydroxyl groups with ammonium-containing reagents such as trimethylammonio-alkyl halides or epoxides. These multifunctional cationic compounds contain at least 0.01 up to about 0.50 cationic groups per recurring unit, preferably from 0.02 to 0.25 cationic groups per recurring unit; they are also part of the invention.

Alternatively, the aldehyde-anionic polymers can be combined with separate cationic compounds such as, for example, cationic polysaccharides, in particular cationic DAS, or with other conventional cationic wet strength agents such as PEI (polyethyleneimine) or PAE, to produce a composite wet-strength agent. The weight ratio between the aldehyde/anionic polymer and the cationic compound can be e.g. from 90:10 to 10:90, especially from 75:25 to 15:85. Such composite wet strength agents are a distinct embodiment of the invention.

The aldehyde-containing anionic polymers can be combined, usually as aqueous solutions or dispersions with cellulosic fibres in a manner known for the application of wet strength agents. The amount of agent is preferably between 0.1 and 4% by weight, especially between 0.2 and 2% by weight, with respect to the cellulosic fibre. If desired, cationic wet strength agents can be applied subsequently followed by drying the fibre web. Addition of a cationic polymer is usually necessary for multifunctional derivatives that do not themselves contain cationic groups, because otherwise there would insufficient absorption of the derivative to the fibre. Further alternate layering with aldehyde-containing anionic polymer and cationic polymer can also be advantageous.

EXAMPLES

Abbreviations:
6-AS:6-aldehyde starch
DAS:dialdehyde starch
MACC:monoaldehydecarboxy cellulose
MACS:monoaldehyde-carboxy starch
PAE:polyamide-amide epichlorohydrin
PAE:polyamide-amide epichlorohydrin
PCD:particle charge determination
PEI:polyethyleneimine Example 1 a) Preparation of MACS with Peracetic Acid/Bromide to Different Degrees of Oxidation Dialdehyde starch (oxidation degree 100%) was prepared by adding 6.6 g sodium periodate (31 mmole) to a slurry of 5.0 g (dry weight) starch (31 mmole) in 100 ml water which was brought to pH 5 with diluted acetic acid and cooled to 4° C. The mixture was stirred for 24 hours at 4° C. in the absence of light. The obtained product was isolated by filtration and washed with water until iodate could no longer be detected by reaction with potassium iodide.

To obtain MACS, the dialdehyde starch was reslurried in 100 ml water and part of the aldehydes were further oxidised to carboxylates, To achieve this, sodium bromide (0.5 g) was added and then peracetic acid (0.6 M) was added portionwise (see Table 1). The pH was kept constant at pH 5 using 0.5 M NaOH (pH-stat.). After reaction, the aldehyde carboxy starch was purified by membrane filtration (molecular cut-off 5000 MW) and freeze-dried.

TABLE 1

Conversion of DAS to MACS

| Sample | Totally added peracetic acid solution (ml of 0.6 M solution) | % aldehydes oxidised to carboxylates |
|---|---|---|
| A5 | 5 | 5 |
| A10 | 10 | 10 |
| A30 | 31 | 30 |
| A50 | 52 | 50 | b) Application as Wet Strength Additive

Figure 6:
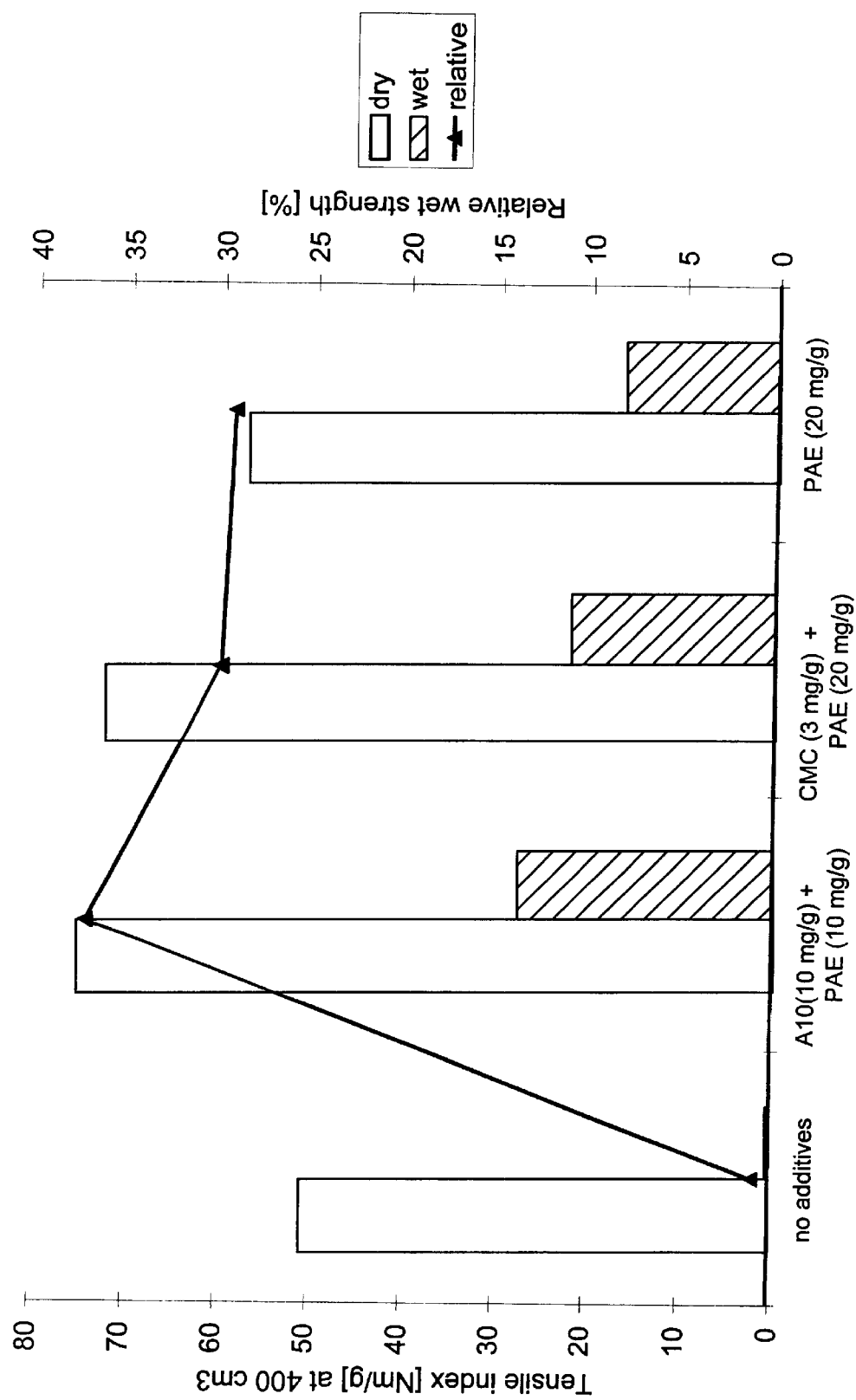

The addition levels were 10 mg/g MACS and 10 mg/g PAE. Sheets were prepared as in example 8. The results are presented in FIG. 1. The highest relative wet strength was obtained in the sheets treated with MACS with an oxidation degree of 10% and PAE. The performance of this combination is better than the combination of CMC ad PAE, which is commonly used nowadays. It may be noted that when no additives are used, essentially no wet strength is obtained (compare FIG. 6).

Example 2

Figure 2:
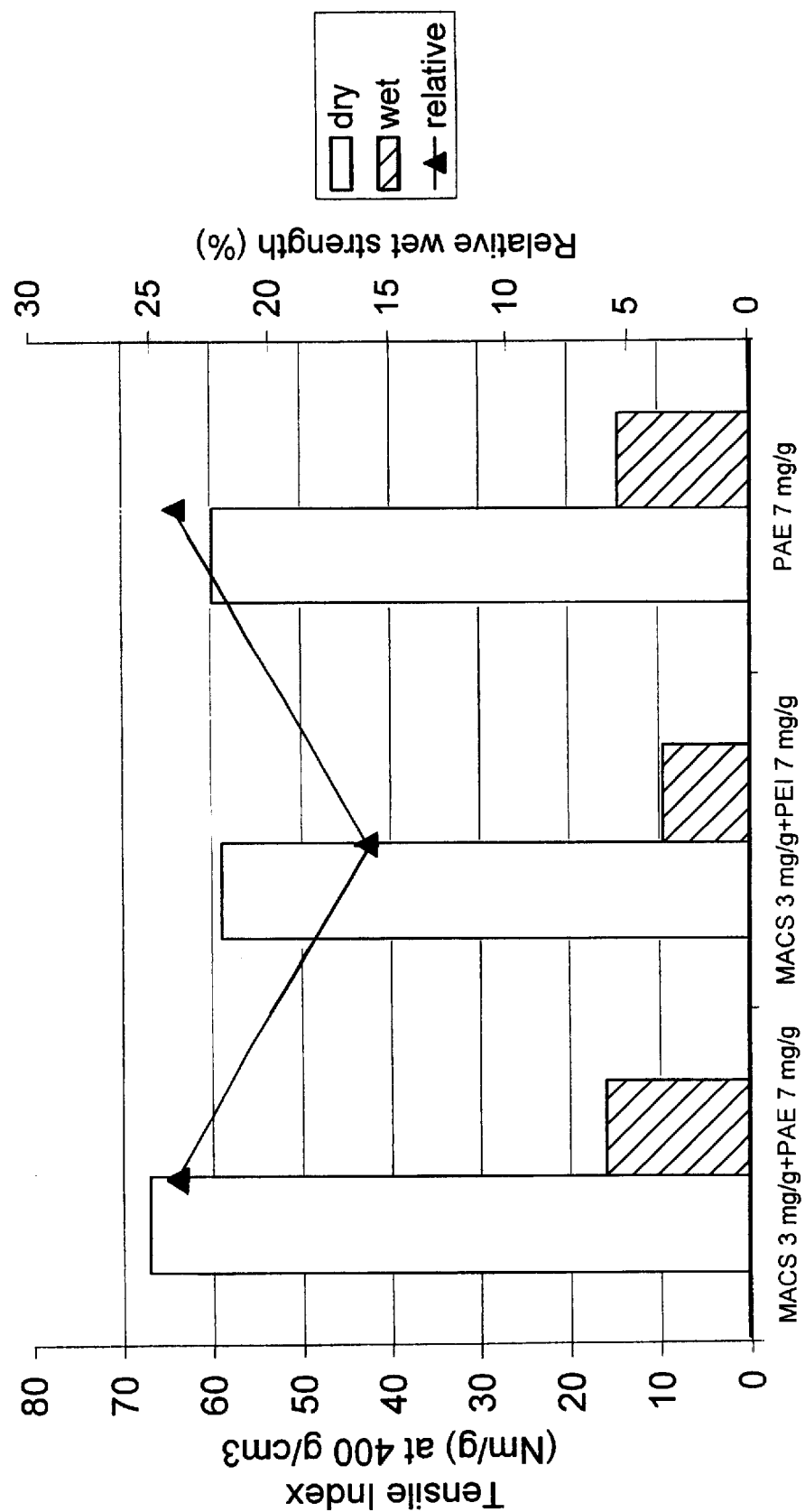

MACS with an oxidation degree of 50% was prepared as described in Example 1. This polymer was added to pulp together with PEI (3 mg/g and 7 mg/g, respectively). Sheets were prepared as in example 8. The results are presented in FIG. 2. It may be noted that PEI does not give wet strength by itself (like PAE does). The wet strength shown in the case of MACS+PEI can be completely ascribed to MACS.

Example 3 a) Preparation of MACS with Chlorite/Hydrogen Peroxide to Different Degrees of Oxidation Dialdehyde starch (oxidation degree 100%) was prepared as described in example 1. To obtain MACS, 5 g of the dialdehyde starch (30 mmole AGU) was reslurried in 100 ml water and cooled to 4° C. In order to oxidise part of the aldehydes to carboxylates, hydrogen peroxide (640 μl of a 30% solution, 6 mmole) and 700 mg sodium chlorite (80% grade, 7.5 mmole) were added (see Table 2). The pH was kept constant at pH 5 using 0.5 M NaOH (pH stat.). After reaction, the aldehyde carboxy starch was purified by filtration and washing with water and the product was subsequently freeze-dried.

TABLE 2

Conversion of DAS to MACS

| Sample | Added hydrogen peroxide solution (30%) (μl) | Added sodium chlorite (80%) (mg) | % aldehydes oxidised to carboxylates |
|---|---|---|---|
| Ac5 | 320 | 350 | 5 |
| Ac10 | 640 | 700 | 10 |
| Ac15 | 960 | 1050 | 15 | b) Application as Wet Strength Additive

Figure 3:
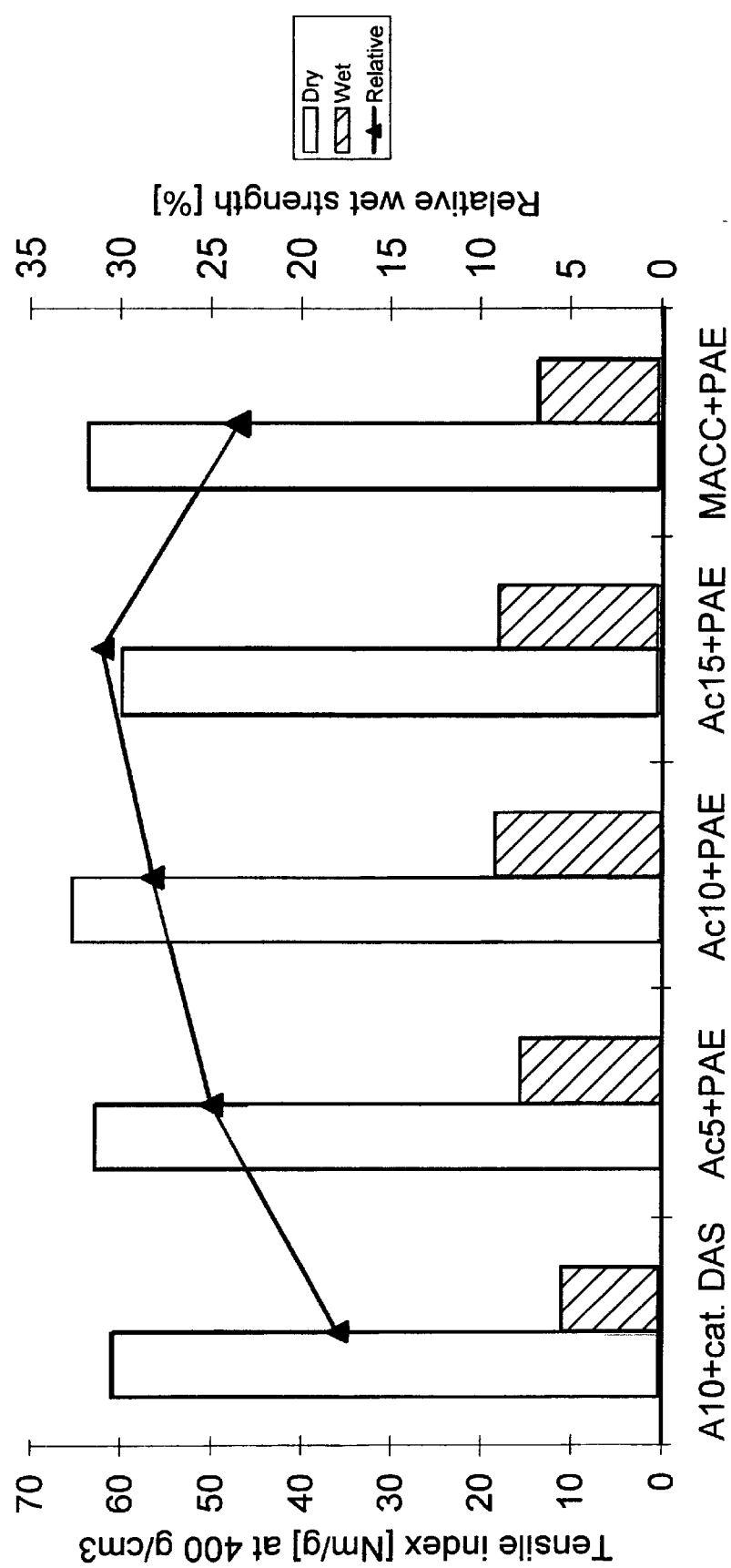

Sheets were prepared as in example 8. The addition levels were 10 mg/g MACS and 10 mg/g PAE. The results are presented in FIG. 3.

Example 4

Dialdehyde cellulose (oxidation degree 100%) was prepared by adding 6.6 g sodium periodate (31 mmole) to a slurry of 5.0 g (dry weight) cellulose (31 mmole) in 100 ml water which was brought to pH 5 with diluted acetic acid and cooled to 4° C. The mixture was stirred for 1 week at 4° C. in the absence of light. The obtained product was isolated by filtration and washed with water until iodate could no longer be detected by reaction with potassium iodide.

To obtain MACC, the dialdehyde cellulose was reslurried in 100 ml water and half of the aldehydes were further oxidised to carboxylates. To achieve this, sodium bromide (0.5 g) was added and then peracetic acid (0.6 M) was added portion-wise (52 ml of a 0.6 M solution). The pH was kept constant at pH 5 using 0.5 M NaOH (pH-stat.). After reaction, the aldehyde carboxy cellulose was purified by membrane filtration (molecular cut-off 5000 MW) and freeze-dried.

Sheets were prepared as in example 8. The result are presented in FIG. 3.

Example 5

MACS with an oxidation degree of 10% was prepared as described in example 1. This material was added to pulp (10 mg/g) together with cationic dialdehyde starch (10 mg/g). Sheets were prepared as in example 8. The results are presented in FIG. 3.

Example 6

Figure 4:
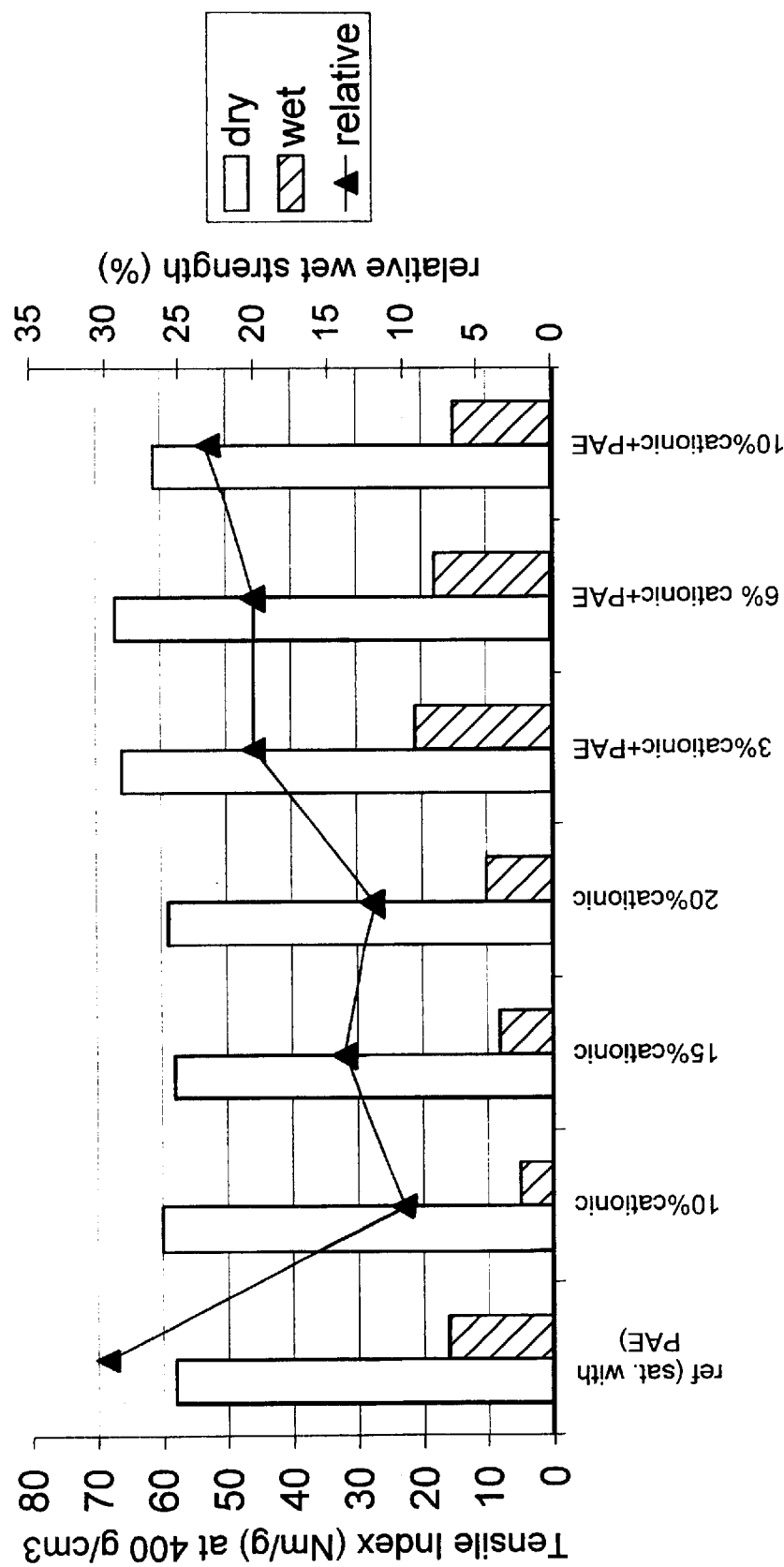

MACS with an oxidation degree of 10% was prepared as described in example 1.1 g of this material was suspended in water and Girard's reagent ($NH_2NHCOCH_2N^+(CH_3)_3$, betaine hydrazide, 100 mg for 10% cationisation) was added. The solution was stirred for 2 hours at 40° C. and was subsequently freeze dried. A cationic MACS derivative was obtained. This sample was added to pulp (addition level 10 mg/g), and sheets were prepared as in example 8. The cationic MACS derivative adsorbs onto the fibres and gives wet strength. When added together with PAE (10 mg/g), the performance increased with lowering of the content of cationic groups (see FIG. 4).

Example 7

6-Aldehyde starch was prepared by a TEMPO-mediated oxidation of starch. 5.0 g (dry weight) starch (31 mmol) was gelatinised in 250 ml water. TEMPO (65 mg) and horseradish peroxidase (100 mg) were added. The pH of the solution was adjusted to 5.0 using diluted acetic acid. Hydrogen peroxide (3.75 ml of a 30% solution, 33 mmole) was diluted to a volume of 125 ml and was added gradually at a rate of 5 ml/hour. The reaction time was 25 hours at room temperature. Adjustment of the pH during reaction was not necessary. The product was purified by membrane filtration (molecular cut-off 5000 MW) and freeze-dried.

Figure 5:
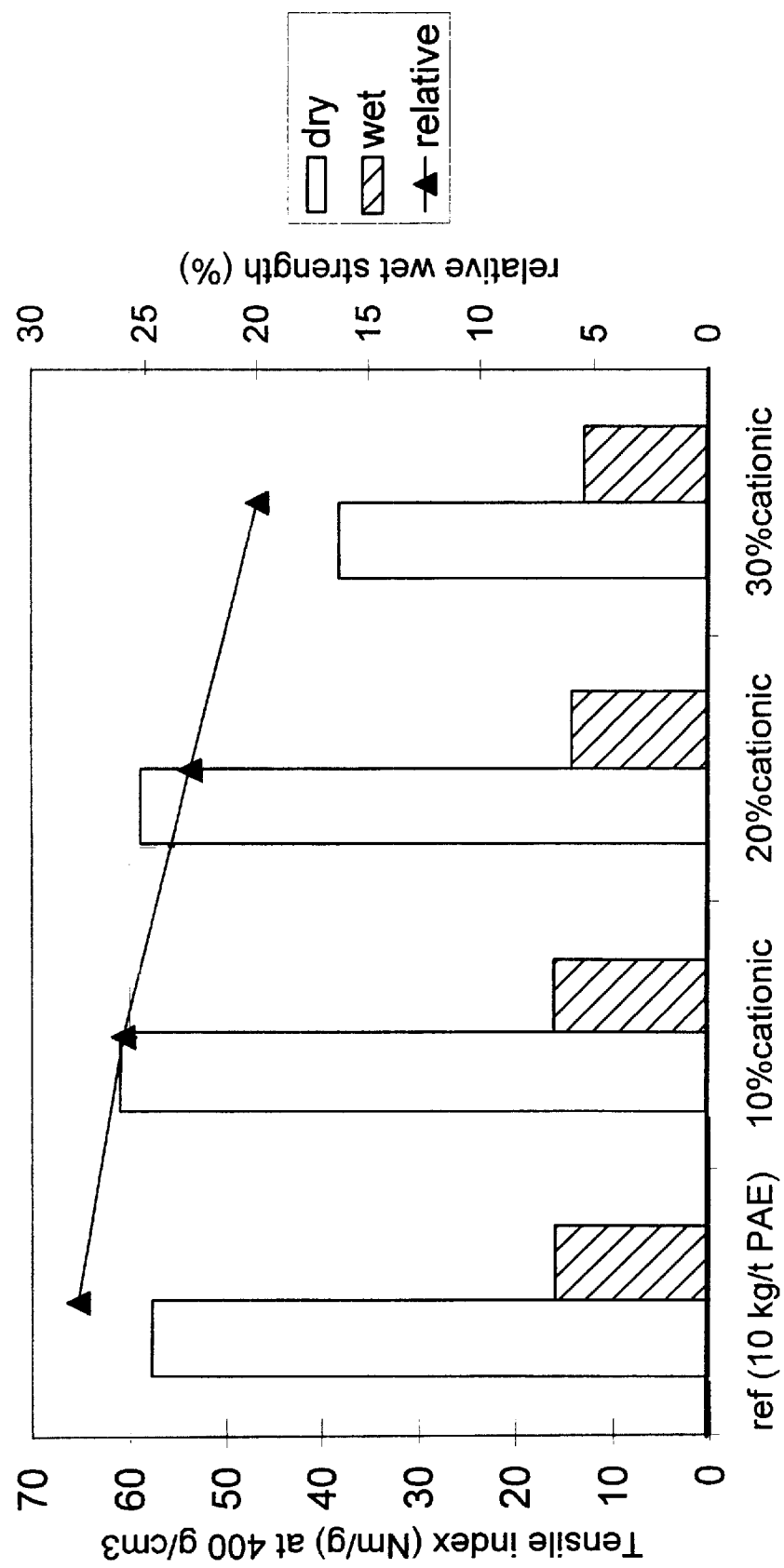

1 g of this material was redissolved in water and Girard's reagent (100 mg for 10% cationisation) was added. The solution was stirred for 2 hours at 40° C. and was subsequently freeze dried again. A cationic 6-aldehyde starch was obtained. This sample was added to pulp (addition level 10 mg/g) together with PAE (10 mg/g). Sheets were prepared as in example 8. The results are shown in FIG. 5.

Example 8
Sheet Making with Derivatives of the Invention
1. Refining
500–530 grams of Östrand TCF pulp is diluted to 12 liters and refined to 25 SR° by a Laboratory refiner R1L, Escher Wyss. The pulp, when refined, is about 40 g/L so it is diluted to the concentration of 3 g/L.

2. Dynamic sheet former, Formette
A wire of 0,4 m² is used and we want the Grammage to be 30 g/m². The pulp is poured into the beater and the wet strength additive is added during stirring for 5 minutes. If PAE is added, it is added after five minutes and the pulp is stirred again for two minutes. Drum speed 1400 rotations/min, dewatering 30 sec.
3. Press
An absorbent paper is put over the sheet and the wire is taken off. Before pressing another absorbent paper is put over the sheet, so the sheet is between the two absorbent papers. The sheet is pressed at 0,5 bar once. To be able to compare sheets with each other, two sheets of the same composition are made but pressed at two different pressures, 0,5 bar and 5 bar. In this way we can compare them at the same density 400 g/cm³.
4. Drying
The sheet is cut into four pieces and dried two and two with a fixed point for three minutes at a temperature of 140° C.
5. Cutting
The sheet is cut into 15 mm strips for testing of dry and wet strength. 100*100 mm is also cut out for measuring the thickness and Grammage.
6. Conditioning
The strips which wet strength is going to be tested are placed in a heating chamber, 105° C. for 10 minutes. Then both the strips for wet and dry strength are placed in a climate room, temperature 23° C., moisture 50% for four hours.
7. Grammage and Thickness
100*100 mm pieces of the sheet is used for measuring the Grammage and thickness. Grammage is measured on a regular balance on 4 layers to get an average. Thickness is also measured on four layers and on five different spots to get a good average.
8. Tensile Strength Measurement
The strength both wet and dry is measured in an Instron SCAN-P58:86.
Five 15-mm strips are measured to get an average.
When measuring the wet strength the strip is soaked for 15 sec in tap water.

Example 9
Large-Scale Preparation of MACS and Application in a Full Scale Tissue Paper Machine The preparation of MACS with 15% of the aldehydes oxidised to carboxylic acids, as described in Example 1, was scaled up to 40 kg scale.

In the first step, 100% dialdehyde starch (DAS) was prepared. Sodium periodate (27 kg) was dissolved in 200 L water in a double-walled 300 L vessel equipped with a mechanical stirrer. The solution was cooled to 5° C. To this solution, potato starch (25 kg, 20.5 kg dry matter) was added portion-wise, keeping the temperature below 10° C. The slurry was stirred for 24 hours at 5° C. Then, the sodium iodate salts were removed by decantation after settling of the DAS. The granules were washed with deionised water until no sodium iodate could be detected with potassium iodide and sulphuric acid. This procedure was repeated once and one more time using 21 kg sodium periodate and 20 kg starch. The overall yield of dialdehyde starch was 47 kg of DAS (82% of theory, due to some losses during the washing procedure).

In the second oxidation step, MACS was prepared. DAS (11.75 kg) was slurried in about 150 L deionised water in a 300 L double-walled vessel. Sodium bromide (1.41 kg) was added and subsequently peracetic acid (7.07 kg, 39% activity) was added slowly using a pump running at 20 mL/min. The pH maintained between 4.7 and 5.3 by a pH controller adding 4 M NaOH. The temperature was kept between 15° C. and 20° C. After all chemicals were added, the solution was stirred overnight to ensure complete reaction. After reaction, the volume was reduced and part of the sodium acetate salts formed during reaction were removed using a membrane filtration unit (exclusion limit of 10000 D) to obtain a solution containing about 10% MACS. This procedure was executed 4 times, and the products were mixed. The reaction yield of MACS in the second oxidation step was 42 kg (87% of theoretical).

A solution (490 kg) containing 8.6% MACS was obtained. The polymer obtained in this way had similar characteristics regarding molecular weight and charge density as the material described in Example 1.

A tissue paper containing MACS was produced at a paper machine. See Example 10.

Example 10

Application in a Full Scale Tissue Paper Machine

With the MACS thus prepared (see Example 9), tissue paper was made on an industrial scale (continuous process) and the properties of the tissue were compared to those obtained with conventional wet strength agents.

Three kinds of tissues were made using the following composition of pulp: 65% TCF pulp (total chlorine free pulp) and 33% HTCTM pulp (high temperature chemithermomechanical pulp).

The first run was the reference, in which only PAE (9 kg/ton pulp) was applied. The second run was prepared using PAE (9 kg/ton pulp) and CMC, Hercobond C129 with a degree of substitution of 0.65–0.9, (1.7 kg/ton pulp). In the third run, PAE (9 kg/ton) and 1.7 kg MACS per ton were used, The results with regard to the dry strength, wet strength, and wet tensile index are summarised in Table 3.

TABLE 3

Wet and dry strength properties of tissue paper with PAE, PAE/CMC and PAE/MACS, respectively.

| Run | Tissue samples | Dry strength (Nm/g) | Wet strength (Nm/g) | Tensile strength index (%) |
| --- | --- | --- | --- | --- |
| 1 | PAE(ref.) | 8.9 | 2.5 | 28.1 |
| 2 | PAE/CMC | 11.6 | 3.2 | 27.3 |
| 3 | PAE/MACS | 10.8 | 3.2 | 29.6 |

As can be seen from Table 3, both MACS and CMC improve the properties of the tissue with regard to wet and dry strength and CMC and MACS exhibit the same properties.

We claim:

1. A method of improving wet strength of a paper, tissue or non-woven product, comprising applying a water-soluble or water-dispersible biopolymer having a molecular weight of at least 800, containing 0.25–2.25 aldehyde groups per recurring unit of the biopolymer and/or at least 5 aldehyde groups per molecule, and containing at least 1 anionic group per molecule, the ratio of aldehyde groups to anionic groups being higher than 0.75:1, as a wet strength additive.

2. The method of claim 1, in which the degree of substitution for aldehyde groups is 0.1–2.95 per recurring unit of the biopolymer, and the degree of substitution for anionic groups is 0.03–1.0 per recurring unit of the biopolymer.

3. The method of claim 1, in which the degree of substitution for aldehyde groups is 0.25–2.25 per recurring unit of the biopolymer, and the degree of substitution for anionic groups is 0.05–0.4 per recurring unit of the biopolymer.

4. The method of claim 1, in which the anionic groups comprise carboxylic groups.

5. The method of claim 1, in which the biopolymer is a polysaccharide.

6. The method of claim 5, in which the biopolymer is starch or cellulose or a starch- or cellulose-derived biopolymer.

7. The method of claim 5, in which the aldehyde groups and the anionic groups are present as a result of oxidation of dihydroxyethylene moieties of recurring monosaccharide units.

8. The method of claim 5, in which the aldehyde groups and the anionic groups are present as a result of oxidation of hydroxymethyl moieties of monosaccharide units.

9. The method of claim 1, in which anionic groups are present as a result of carboxymethylation.

10. The method of claim 1, in which the biopolymer further contains cationic groups with a degree of substitution of 0.01–0.50.

11. A cellulosic fibre treated with a biopolymer as defined in claim 1.

* * * * *